Figure 2:
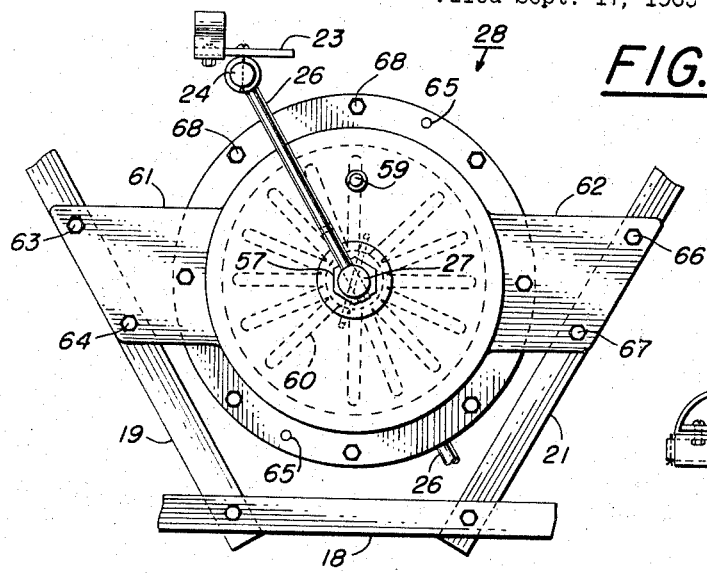

March 19, 1968     G. K. LUDEMAN     3,373,992

BICYCLE EXERCISER

Filed Sept. 17, 1965

INVENTOR.
GILBERT KENNETH LUDEMAN
BY

Richard L. MacNeill

United States Patent Office 3,373,992
Patented Mar. 19, 1968

3,373,992
BICYCLE EXERCISER
Gilbert K. Ludeman, 3548 College Ave.,
San Diego, Calif. 92115
Filed Sept. 17, 1965, Ser. No. 488,052
2 Claims. (Cl. 272—73)

The present invention relates to a bicycle exerciser, and more particularly to a bicycle exerciser utilizing a simple sawhorse type construction.

According to the invention, a sawhorse constructed of aluminum, for example, is provided with an adjustable handle bar arrangement, together with an adjustable seat on the top thereof. Both the handle bar and seat can be also constructed of aluminum, for lightness in weight, together with structural strength. A pedal unit is mounted beneath the seat and handle bar, for simulating a bicycle pedalling action. The axle between the pedals passes through an oil bath and is attached to a paddle wheel which forms a novel, inexpensive impediment to the pedalling action. The oil utilized is extremely heavy weight, on the order of SAE 250. The entire unit can be shipped and sold in a disassembled state, since the assembly is quite simple and can be effected with a minimum of tools and skill by the consumer.

An object of the present invention is the provision of an improved bicycle exerciser.

Another object is to provide a bicycle exerciser having a novel paddle wheel pedalling impediment.

A further object of the invention is the provision of a bicycle exerciser which is simple to manufacture and assemble.

Still another object is to provide a bicycle exerciser which is extremely durable and relatively inexpensive.

Figure 3:
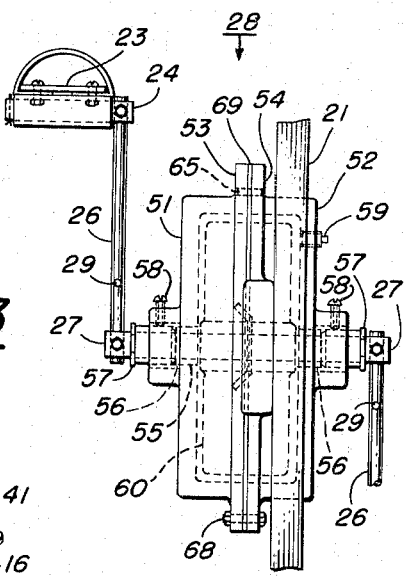
Figure 1:
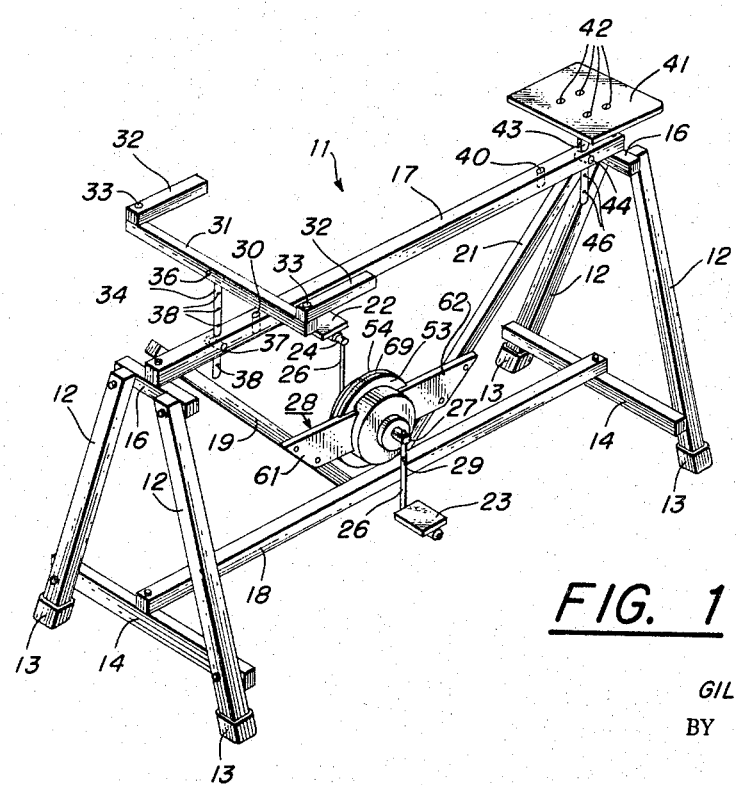

Other objects and many of the attendant advantages of this invention will be readily appreciated as the same becomes better understood by reference to the following detailed description, when considered in connection with the drawing in which like referenced numerals designate like parts throughout the figures thereof, and wherein:

FIG. 1 is a perspective view of the preferred embodiment of the present invention; and FIG. 2 is a side elevation view of the paddle wheel impediment of FIG. 1; and FIG. 3 is an end elevation of the paddle wheel impediment of FIG. 2.

Referring to FIG. 1, bicycle exerciser 11 is constructed of a saw horse having legs 12 with rubber feet 13, lower cross-members 14 and upper cross-members 16. Upper cross-members 16 are connected by a crossbar 17 and lower cross-members 14 are connected by a crossbar 18. Braces 19 and 21 are connected between upper crossbar 17 and lower crossbar 18.

Pedals 22 and 23 are rotatably carried by pedal rods 24, which are rotatably mounted to axle rods 26. Axle rods 26 are adjustably mounted to axle 27, which is rotatably carried by casing 28. Casing 28 is mounted to and between braces 19 and 21.

Handle bar 31 has handles 32 attached thereto by bolts 33 and is attached to mounting rod 34 by bolt 36. Mounting rod 34 is adjustably attached to crossbar 17 by bolt 37 and has apertures 38 for adjustment thereto. Seat 41 is attached to a bracket (not shown) by screws 42, which in turn is attached to mounting rod 43. Mounting rod 43 is adjustably attached to top support 17 by bolt 44, and has apertures 46 for adjustment thereto. Axle rods 26 have apertures 29 for an adjustable attachment to axle 27.

Referring to FIGS. 2 and 3, housing 28 is comprised of two sections 51 and 52, which are bolted together at flange extensions 53 and 54, respectively. Axle 27 passes through bushings 55 and packings 56 which are held in place by packing nuts 57. Set screws 58 hold packing nuts 57, once adjusted. Plug 59 in section 52 provides a means for filling housing 28 with oil. Paddle wheel 60 is carried by axle 27 and rotates therewith. Extension flanges 61 and 62 of housing member 52 are bolted to braces 19 and 21 at 63, 64, 66 and 67. Bolts 68 hold sides 51 and 52 of housing 28 together, sealed by gasket 69. Dowels 65 are for alignment of sections 51 and 52.

The various connecting bolts and clamps holding the A frame together have not been discussed since they do not form a part of the invention per se, and would tend to confuse rather than enlighten. It is to be understood that any conventional fastening means may be used, other than the bolts and mounting clamps indicated.

It can be seen from the drawings and description that the entire unit can be disassembled quite simply for convenience in shipping, and can be assembled with a minimum of effort by the user. Housing 28 would be shipped without oil, and would be simply and easily assembled, as illustrated, the oil being added as a last step through fill plug 59, prior to mounting on support members 19 and 21. The plurality of mounting bores in seat post 43 and handle bar post 34 and their mounting bores 40 and 30, respectively, in crossbar 17, allow for complete adjustment for universal sizing to any consumer. These are further augmented by the utilization of an adjustable mounting of axle rods 26 to axle 27.

It should be understood, of course, that the foregoing disclosure relates to only a preferred embodiment of the invention, and that it is intended to cover all changes and modifications of the example of the invention herein chosen for the purposes of the disclosure, which do not constitute departures from the spirit and scope of the invention.

What is claimed is:
1. A bicycle exerciser comprising:
   a saw-horse frame having a top cross-bar connected between first and second ends thereof;
   handle bar means adjustably attached to said top cross-bar in proximity to said first end;
   seating means adjustably attached to said top cross-bar in proximity to said second end;
   first and second pedal means rotatably mounted on said saw-horse frame between said first and second ends and beneath said top cross-bar; an impedance means comprising a liquid bath mounted between said first and second pedal means, said pedal means being connected to an axle passing through said liquid bath; and a paddle wheel carried by said axle and positioned within said liquid bath.
2. In a bicycle exerciser having a frame with handle bars and a seat mounted thereon and first and second rotatable pedals carried thereby, the improved pedal impedance means comprising:
   a liquid bath mounted between said first and second pedals;
   said first and second pedals being operably connected to an axle, said axle passing through said liquid bath; and
   a paddle wheel carried by said axle and positioned within said liquid bath.

References Cited

UNITED STATES PATENTS

| 351,311 | 10/1886 | Conkling | 272—73 |
| 584,989 | 6/1897 | Davis | 272—73 |
| 1,909,002 | 5/1933 | Oehlberg | 272—73 |
| 3,075,766 | 1/1963 | Buscher | 272—73 |

RICHARD C. PINKHAM, *Primary Examiner.*